Patented Mar. 28, 1939

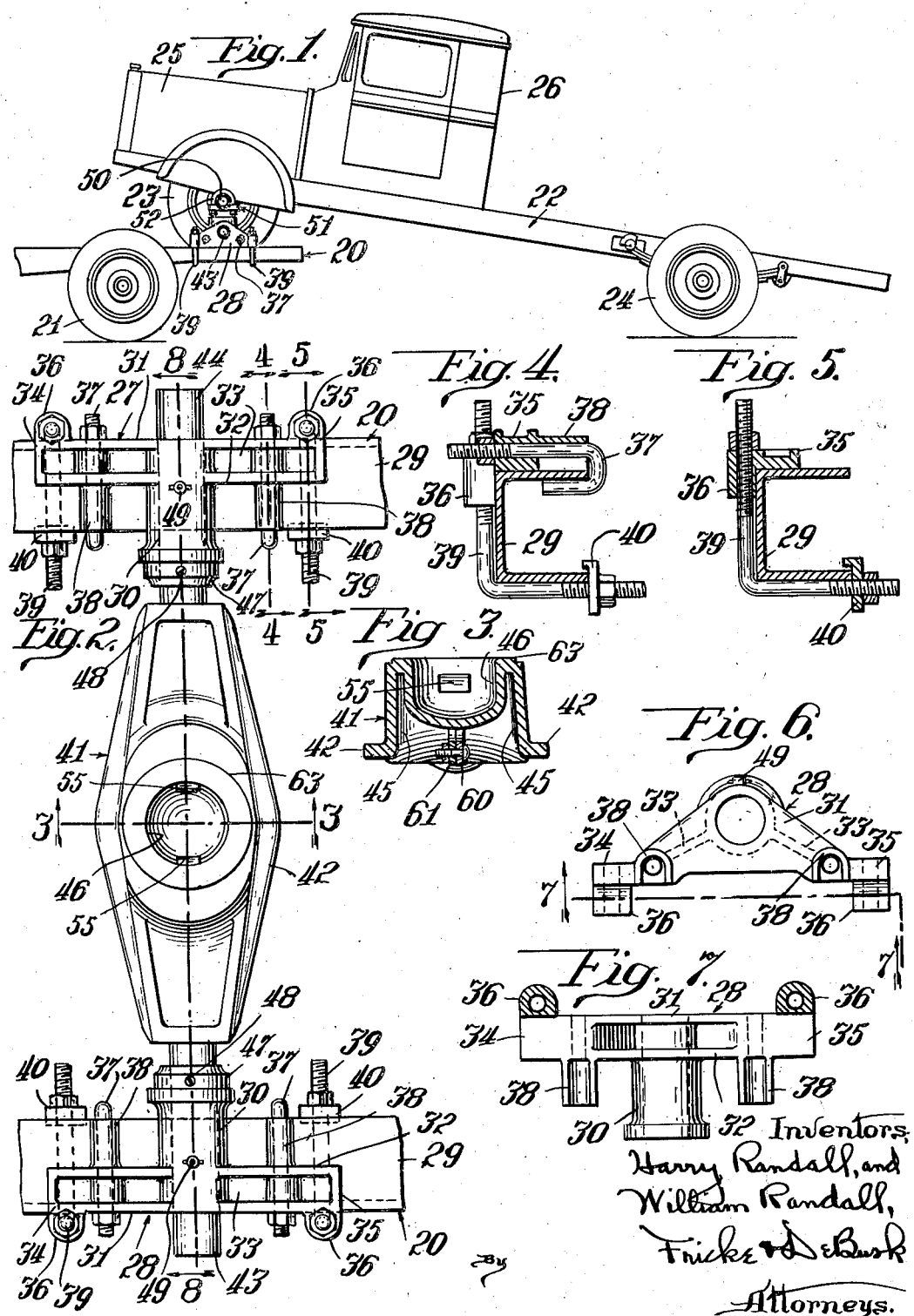

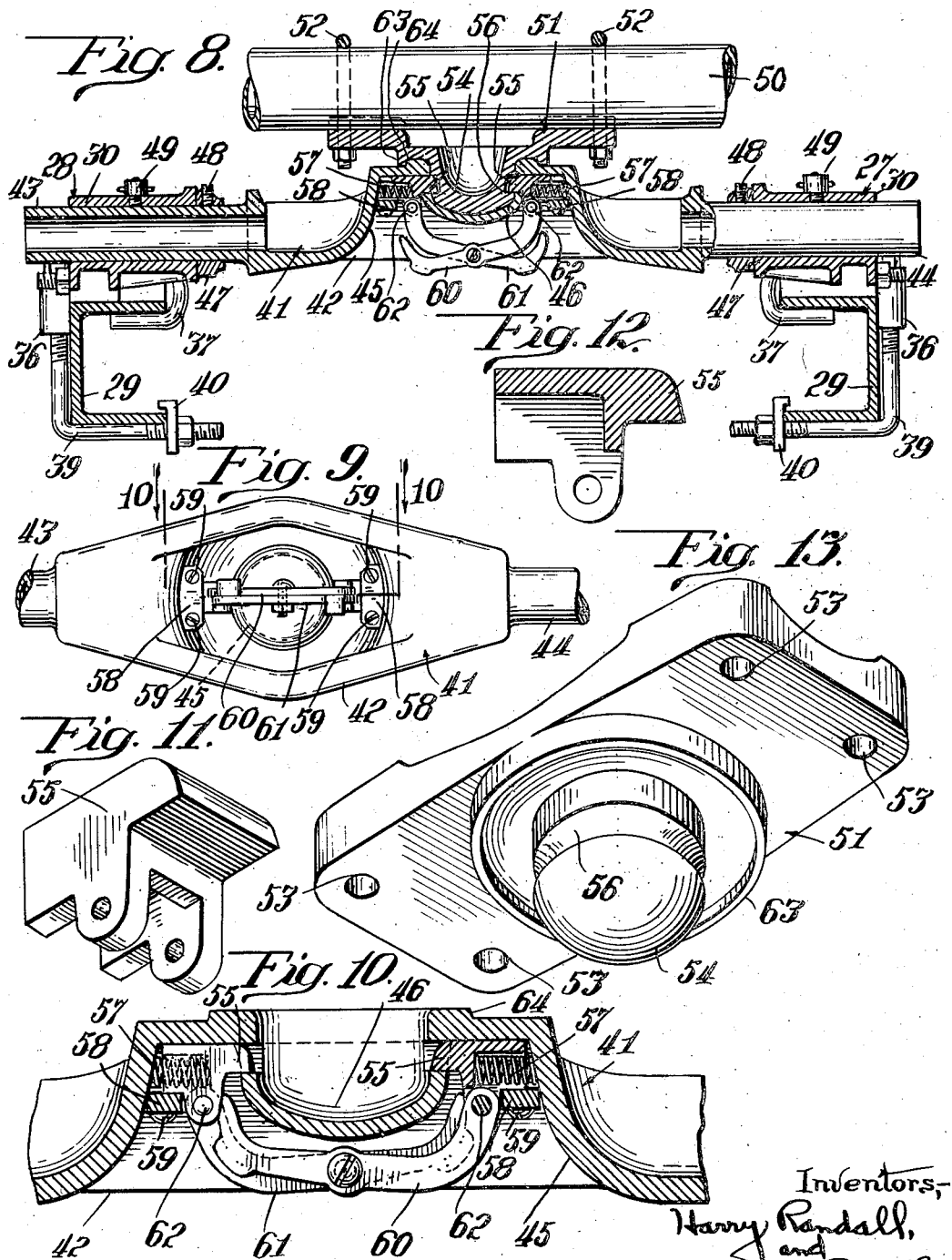

2,152,279

UNITED STATES PATENT OFFICE 2,152,279

TOWING DEVICE FOR TRUCKS AND THE LIKE

Harry Randall and William Randall, Chicago, Ill.

Application April 9, 1936, Serial No. 73,466

4 Claims. (Cl. 308—137)

Our invention relates to towing devices for trucks and the like by the use of which two chassis may be connected, with the front end of the rear chassis elevated and supported by the rear end portion of the front chassis so as to enable the rear chassis to be towed as a two-wheel trailer. It is the object of our invention to provide a new and improved form and arrangement of parts by reason of which a coupling of great strength is provided between the towing car and the trailer but of as light weight as is consistent with the strength required for resisting the stresses normally brought to bear on the parts, by which the connection of the coupling devices to the two trucks or other vehicles may be effected quickly and easily, by which the two vehicles may be very quickly and easily connected and again disconnected as may be required without removal of the coupling devices therefrom, and by which the proper lubrication of the parts may be assured so as to enable the device to stand up in use for long periods under trying conditions.

It is another object of our invention to improve devices of this type in sundry details hereinafter pointed out. The preferred means by which we have accomplished our several objects are illustrated in the drawings and are hereinafter specifically described. That which we believe to be new and desire to cover by Letters Patent is set forth in the claims.

In the drawings,—

Fig. 1 is a side view of the rear end portion of a truck chassis in operative relation to another truck chassis for towing it by the use of our improved apparatus;

Fig. 2 is a top plan view of the parts of the coupling apparatus in position on a fragmentary portion of the truck shown at the left in Fig. 1;

Figs. 3, 4 and 5 are vertical cross sectional views taken at the line 3—3 and the line 4—4 and the line 5—5 respectively of Fig. 2;

Fig. 6 is a side face view of one of the bearing block members forming a part of the mechanism shown in Fig. 2;

Fig. 7 is a horizontal sectional view taken at line 7—7 of Fig. 6;

Fig. 8 is a transverse sectional view taken at line 8—8 of Fig. 2;

Fig. 9 is a bottom plan view of the intermediate portion of the heavy cross bar of the device;

Fig. 10 is a vertical sectional view taken at line 10—10 of Fig. 9;

Fig. 11 is a perspective view of one of the latch lugs forming part of the arrangement as shown in Fig. 8;

Fig. 12 is a central vertical sectional view through the latch lug of Fig. 11; and Fig. 13 is a perspective view of the heavy plate or turn-table by which the mechanism is connected with the chassis or other vehicle being towed.

Referring now to the several figures of the drawings, in which corresponding parts are indicated by the same reference characters, 20 indicates the chassis of a truck only the rear end portion of which is shown in Fig. 1, and comprising carrying wheels 21. 22 indicates the chassis of a second vehicle comprising front carrying wheels 23 and rear carrying wheels 24, the chassis in the arrangement shown being provided with the usual mechanical parts underneath the hood 25 and being provided with a cabin 26 of any approved type for a driver.

The means for connecting the two chassis as shown in Fig. 1, with the front end of the chassis 22 resting upon the rear end portion of the chassis 20, comprises bearing block members 27 and 28 mounted securely upon the channel bars 29 forming the principal frame portions of the chassis 20. In the arrangement shown, each of the bearing block members is in the form of a malleable casting formed all in a single unit comprising a bearing sleeve portion 30, plate portions 31 and 32 in transverse position with respect to the sleeve and in spaced relation to each other, being connected to each other by means of webs 33, at their ends. The plates 31 and 32 are merged into bearing portions 34 and 35 which are in downwardly spaced relation at their bottom faces with respect to the bottom edge faces of the plates 31 and 32, as is clearly shown in Fig. 6. Lugs 36 are provided depending from the bearing portions 34 and 35 at the outer side face of the bearing block in position to engage the side faces of the channel bars 29 of the chassis 20.

The means for mounting the bearing block members upon the chassis 20 so as to hold the sleeve portions 30 in transversely aligned position with respect to each other comprises two hook bolts 37 extending through suitable openings in the bearing portions 34 and 35 of the block in position to hook about the inner edge of the top flange of the channel bar 29 (see Fig. 4). Over the hook bolts 37 at the sides of the bearing portions 34 and 35, we have provided inverted channel pieces 38 having their lower edges in position to engage the top face of the channel bar 29 for steadying the block in position with respect to the chassis. At each end of each of the bearing block members we provide also L-bolts 39 which are mounted in suitable openings in the lugs 36 so as to engage the outer face and the bottom face of the channel bar 29 (see Fig. 5). As is best shown in Fig. 5, heavy washers 40 are provided on the horizontally extending portions of the L-bolts 39 for engagement with the inner edge of the channel bar 29 of the chassis frame.

By the use of our improved arrangement as above described, the bearing blocks are very securely mounted in position by the bolts 37 and 39. By reason of the upwardly offset position of the lower edges of the plates 31 and 32, and further by reason of the fact that said plates are spaced at some little distance from each other, positions are readily found upon the rear end portion of a truck chassis at which the bearing blocks can be given a satisfactory engagement with the chassis frame bars regardless of the rivet heads and bolt heads which in some cases are present at the upper faces of the chassis bars. By shifting the blocks slightly backwardly or forwardly an operator is able to secure the blocks firmly in position in the desired transverse alignment.

Between the bearing blocks 27 and 28, we have provided a heavy bar 41 comprising an intermediate portion 42 in the form of a shell as hereinafter described and end portions in the form of shafts 43 and 44 journaled within the bearing sleeves 30. In the arrangement shown, the intermediate portion of the heavy bar 41 comprises a downwardly open dished part 45 (see Fig. 10) which extends substantially across the bar transversely thereof, as is clearly shown in Fig. 3, an upwardly open dished part 46 being provided in substantially centered position within the downwardly open dished portion so as to provide a large socket in the upper face of the bar. As is perhaps best shown in Fig. 8, the intermediate portion of the bar merges at its ends into the shaft portions 43 and 44 which are tubular in form so as to be of comparatively great strength in proportion to their size. For holding the bar 41 in centrally adjusted position between the bearing sleeves 30 we have provided collars 47 secured by means of set screws 48 on the shafts in position to engage the inner ends of the bearing sleeves 30. Grease gun fittings 49 are provided in the upper face portions of the bearing sleeves 30 for the delivery of a suitable lubricant to the bearing sleeves.

Upon the front axle 50 of the truck to be towed, we mount a turn-table 51 in the form of a heavy plate as shown in Fig. 13, the plate being secured in position in the arrangement shown by means of U-bolts 52 extending about the axle and thence downwardly through openings 53 in the plate. At its central portion on the bottom face of the plate, it is provided with a circular boss 54 which has a working fit within the socket 46 of the heavy cross bar, as is clearly shown in Fig. 8. With the cross bar 41 in position upon the chassis of the truck at the left in Fig. 1 and with the turn-table 51 in position upon the chassis of the truck at the right in said Fig. 1, the front end of the truck to be towed is raised and then lowered in position for the boss 54 to enter the socket 46. Means is provided for holding the boss 54 releasably in position within the socket, such means in the arrangement shown comprising latch lugs 55 carried by the cross bar engaging in a circumferential groove 56 extending about the boss 54 (see Fig. 13). The latch lugs 55 are normally held at the limit of their motion inwardly as shown in Fig. 8 by means of springs 57 interposed between the latch lugs 55 and the adjacent portion of the wall of the dished portion 45. The springs 57 are held removably in position by means of plates 58 which in turn are held in position by means of screws 59. As is shown in the drawings, the upper faces of the inner end portions of the latch lugs are beveled so as to enable the boss 54 of the turn-table to force the latch lugs outwardly by a camming action against the force of the springs 57 for the movement of the parts into position. As soon as the groove 56 comes opposite the ends of the lugs, they are forced inwardly into operative engagement as shown in Fig. 8 serving to permit free rotary movement of the turn-table about a vertical axis but serving effectively to prevent withdrawal of the boss 54 from the socket.

Means is provided for enabling the operator to retract the latch lugs 55 when desired. This means comprises two levers 60 and 61 pivotally connected together at their middle portions underneath the socket portion 46 of the cross bar, each of such levers being pivotally connected at one end with one of the latch lugs by the use of a pivot pin 62. The levers 60 and 61 are so arranged that when the levers are pressed upwardly within the dished portion 45 toward the wall of the socket 46 the latch lugs 55 are moved outwardly against the action of the springs 57 so as to permit the boss 54 to be removed from the socket. The arrangement is such that when the levers 60 and 61 are moved upwardly to the limit of their motion the levers engage portions of the latch lugs so as to be held yieldingly against a return downward movement. Upon the removal of the boss 54 from the socket 46, a slight downward pull upon the levers 60 and 61 is sufficient for bringing them again into their lowered position with the locking lugs 55 moved accordingly into locking position.

About the lug 54 on the turn-table 51, we have provided a downwardly extending flange 63 which fits downwardly on the outside of a shoulder portion 64 of the cross bar so as to assist in the retention of cup grease within the socket 46 about the boss 54. By the use of the arrangement as shown, very satisfactory lubrication of the parts is assured.

By the use of our device a truck or chassis can be towed very satisfactorily as shown in Fig. 1. It is to be understood, however, that our invention is not limited to use for towing a complete truck, since the mechanism is manifestly suitable for use for connecting the chassis of any two-wheel trailer to another vehicle for towing purposes, whether such trailer chassis is in complete truck form or otherwise. It will be understood that our claims are to be construed accordingly.

By reason of our arrangement, our towing mechanism is adapted for use under trying conditions for long trips and for extended periods of time, even though only moderate attention is given to the matter of lubrication. The grease placed initially within the socket 46 when the two vehicles are first connected is adapted to remain in operative position indefinitely by reason of the form and arrangement of the parts.

While we prefer to employ the form of arrangement as shown in our drawings and as above described, it is to be understood that our invention is not limited to such form and arrangement except as it may be so limited by the terms of the narrower claims, it being understood that changes might well be made in the form and arrangement of the parts without departing from our invention.

We claim:

1. In a vehicle towing device, the combination of a bearing sleeve, a block rigidly connected to said sleeve at right angles thereto and having a portion of its bottom face offset upwardly to enable it to fit over rivet heads or the like, lugs extending downwardly from said block at one side face thereof, and bolts carried by said block arranged to have hooked engagement with a frame bar for holding the block rigidly in position with said lugs pressed firmly against the side face of said frame bar.

2. In a vehicle towing device, the combination of a bearing sleeve, a block rigidly connected to said sleeve at right angles thereto and having a portion of its bottom face offset upwardly to enable it to fit over rivet heads or the like, lugs extending downwardly from said block at one side face thereof, a pair of bolts carried by said block in parallel relation to each other adapted by hooked engagement with a frame bar to hold said lugs pressed firmly against the side face of said frame bar, and a third bolt carried by said block in right angular position with respect to said first named bolts arranged also to have hooked engagement with said frame bar.

3. In a vehicle towing device, the combination of a bearing sleeve in the form of a casting, two plates formed integrally with said bearing sleeve in crossed relationship to the sleeve and in spaced relationship to each other, bearing block portions formed integrally with said plates at both ends thereof with the lower edges of the plates offset upwardly with respect to the bearing block portions, lugs formed integrally with said bearing block portions at the ends of the device and extending downwardly in position to engage the side face of a frame bar upon which the device rests, and hook bolts carried by the device adapted by engagement about said frame bar to hold the bearing sleeve mounted rigidly in position thereon.

4. In a vehicle towing device, the combination of a bearing sleeve in the form of a casting, two plates formed integrally with said bearing sleeve in crossed relationship to the sleeve and in spaced relationship to each other, bearing block portions formed integrally with said plates at both ends thereof with the lower edges of the plates offset upwardly with respect to the bearing block portions, webs extending from said sleeve to the bearing block portions between said plates and formed integrally with said parts for strengthening the device, lugs forming integral extensions of the device downwardly at one side for engagement with the side face of a frame bar, other lugs forming integral extensions of the device horizontally at the opposite side of the device for engagement with the top face of said frame bar, and hook bolts mounted in said lugs adapted by engagement about said frame bar to hold the bearing sleeve mounted rigidly in position thereon.

HARRY RANDALL.
WILLIAM RANDALL.